April 18, 1939.  C. E. HADSELL  2,154,933
REFRIGERATING PAD
Filed June 9, 1937
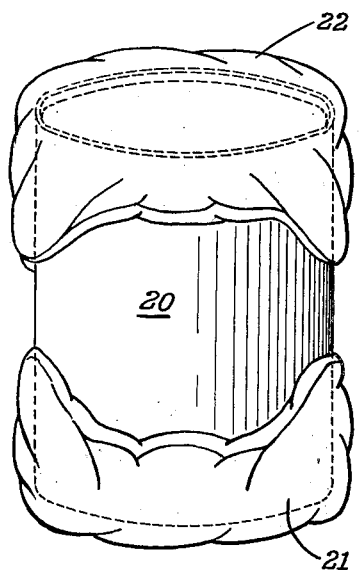
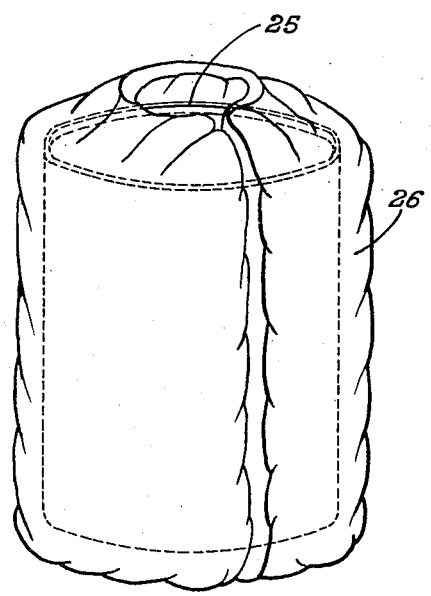
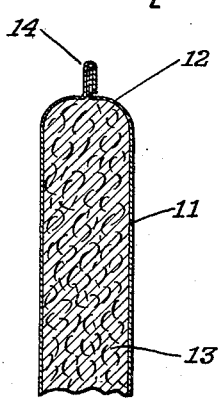
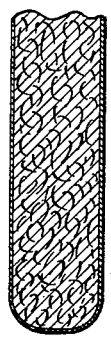
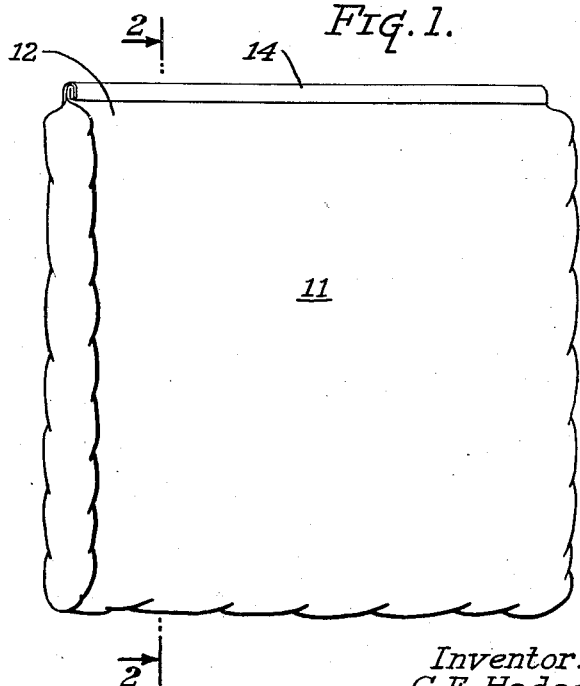
Inventor.
C. E. Hadsell
By Hazard and Miller
Attorneys.

Patented Apr. 18, 1939

2,154,933

UNITED STATES PATENT OFFICE 2,154,933

REFRIGERATING PAD

Charles E. Hadsell, Los Angeles, Calif.

Application June 9, 1937, Serial No. 147,306

7 Claims. (Cl. 62—1)

My invention relates to the construction of a flexible pad which may be to a certain extent shaped to fit an article to be maintained in a refrigerated condition, the pad with its contents may then be frozen and if desired refrigerated with the article that is to be maintained in a cool condition whereby the frozen pad which may be at a temperature below normal freezing, will retain the particular article in its proper frozen condition for a reasonable period of time considering the inexpensive character of my refrigerating pad.

An object and feature of my invention is the construction of an inexpensive pad which at temperatures above freezing may be shaped to partly engage an article to be maintained refrigerated, the pad being formed of water proof material such as oiled paper, Cellophane or like inexpensive material. The pad is made somewhat in the form of a bag and is filled with an inexpensive comminuted fibrous absorbent material which may be saturated with an aqueous solution. The filling of the pad should have sufficient absorbent characteristics so that there will practically be no free solution in the bag. Then when the pad including the contents is refrigerated or frozen the aqueous solution manifestly congeals, thereby causing the absorbent material to form into a more or less solid mass which will retain the bag in a shape in which it has been molded on the article to be maintained in a chilled condition. Therefore the pad will maintain a close contact with such article. For instance the pads may be used in packaging frozen confections such as ice cream, the pads being placed on for instance opposite ends of the container or wrapped around the container.

A further object and feature of my invention is incorporating an agent in the aqueous solution which will lower its freezing point below that of fresh water, thus requiring a lower temperature to freeze the pad to a solid condition and hence also the pad will melt or thaw out more slowly with such a reagent than if the absorbent material contains fresh water. Another advantage of the use of a pad made after the manner of my invention is that it gives an indication of the approximate frozen condition of the confection or the like which may be in the container. For instance if the container is wrapped in a pad of this character or has pads against its opposite ends and these are frozen to maintain a stiff condition, so long as they remain frozen and the pad is stiff, a person can be assured that the confection is likewise maintained in a proper frozen condition, whereas if the pad thaws out and becomes soft and pliable, an indication is given that the confection will likewise melt in a comparatively short time and therefore precaution should be taken either to use the confection promptly or to assure that either the confection or the pads are re-frozen.

While my invention is not limited to any particular shape or type of pad, I prefer to make such pad somewhat in the form of a bag of flexible material which as above mentioned is water proof and after filling the bag with the absorbent comminuted material with the acqueous solution, the open end of the bag may be sealed with material forming a water tight closure, for instance the bag at the opening may be folded and by use of a hot iron, roller or the like with a suitable wax may be sealed to be water tight. Such a type of pad may be made of such inexpensive material as to the bag itself and the absorbent material which may be fine sawdust that after use the bag may be discarded, hence a person selling a frozen confection may have the container or carton either covered at the ends or the sides or in both places by suitable pads which after they have served their purpose may be thrown away.

My invention is illustrated in connection with the accompanying drawing, in which:

Fig. 1 is a perspective view of one form of my pad.

Fig. 2 may be considered as a transverse section on the line 2—2 of Fig. 1 in the direction of the arrows.

Fig. 3 is an illustration showing the manner of using a pair of flexible pads wrapped over the ends of a container or the like for a frozen confection.

Fig. 4 is an illustration of another manner of using a relatively large pad in which this is wrapped around the sides and over the ends of the carton or container.

The wall of the pad indicated by the numeral 11 is made of flexible material of an inexpensive character such as oiled or waxed paper, water-proof Cellophane or other type of sheet material which may be readily water proofed and if it is desired to use the pad over and over again, such a pad may be made of oiled or waxed cotton. The material of the cover may if desired be made of paper or cotton impregnated with asphaltum or the equivalent. The bag may be made in the ordinary manner having a water proof cement or glue at the seams. It may be considered as formed with a top 12 opened before filling so that a packing 13 of absorbent comminuted material may be packed in the bag. Such a filling may be fine cut sawdust, paper pulp in a loose condition, cotton flock or other inexpensive somewhat fibrous and absorbent material. An aqueous solution is poured in the bag until the material forming the packing becomes properly saturated, the material absorbing a certain amount of the solution and the solution filling the interstices between the particles of the filler. However there should not be sufficient water or other aqueous solution so that free water will come to the top of the bag. Such a solution may have an agent incorporated therein to lower the freezing point below that of fresh water. Such an agent may be common salt, calcium chloride or other soluble compounds or materials which lower the freezing point of the water below that of fresh water which is 32 degrees F.

The top of the bag then has a closure 14 which is illustrated by having a fold with a water proof cement. This may be a paraffine wax, bituminous material or other suitable binder or cement and to assure that the pad is properly sealed the closure may be pressed with a hot iron or roller. The pad when so sealed and before being frozen is quite flexible and may be readily shaped to wrap around different articles to be maintained in a cold condition. For instance in Fig. 3 a carton or container is indicated by the numeral 20 in which a lower pad 21 and an upper pad 22 may be fitted and somewhat pressed around the bottom and top, the pad extending upwardly from the bottom on the sides of the carton and at the top extending downwardly. The pad is so shaped on the container before being frozen. The carton with the pads may then be refrigerated until the pads become frozen and solid in which case they will be quite stiff and more or less adhere to the carton or container due to being shaped to conform to the container before being frozen. Of course it is obvious that pads applied to the top or bottom of the carton may be shaped by hand to approximately the desired shape of the carton and then frozen and after this they may be applied to the carton.

In the construction of Fig. 4 the carton 25 is illustrated as having a flexible bag such as 26 wrapped around the sides and partly folded over the bottom and top or if desired the bag may be only wrapped around the side. The bag with the carton of confection enclosed therein may then be refrigerated until the bag is frozen solid. While the illustrations of Figs. 3 and 4 show the ordinary type of cylindrical carton or container for frozen confections, it will be understood that these may be of various shapes and as the bag is flexible before the filling is frozen, it may be readily shaped to conform to the shape of the carton.

As above mentioned, when the bag or pad is properly frozen it becomes quite stiff and rigid and as it thaws it will again become flexible. So long as the bag is quite stiff from being frozen, it gives assurance for instance to a vender of frozen confections that such confection is also maintained properly frozen, that is, in a refrigerated condition. Hence as the bag softens, it serves as a warning that there is danger of the confection melting and such vender may take precautions to either have the confection with the bag again refrigerated or sell the merchandise before the bag becomes softened. It is to be understood that the bags are so inexpensive that the cartons of frozen confection may be sold and merchandised with the bags frozen and thus partly enclosing the carton. The purchaser may then in using the confection discard the pads.

Various changes may be made in the details of the construction without departing from the spirit or scope of the invention as defined by the appended claims.

I claim:

1. A refrigerating pad comprising in combination a flexible water proof closed bag having a filling of comminuted absorbent material impregnated with a liquid having a lower freezing point than fresh water, said material and liquid being confined by the bag and forming a pad having the characteristics that when the liquid is not frozen such pad as a whole is flexible and may be molded to a desired shape and further having the characteristic that when the liquid is frozen, the pad becomes rigid and retains the molded shape.

2. A refrigerating pad as claimed in claim 1, the said material being of fine cut sawdust and the liquid being common salt, calcium chloride or other similar compounds having a freezing point below 32 degrees F.

3. A refrigenating pad having in combination a bag formed of relatively inexpensive water proof material closed and sealed, a filling in the bag of comminuted liquid absorbent material, the bag with the filling having the characteristics of a somewhat flatened bag, a liquid in the bag and filling the interstices of the material and having the characteristics of being at least in part absorbed by such material, such liquid having the characteristics of a lower freezing point than that of fresh water, the pad having the characteristics of being flexible at temperatures above the freezing point of the liquid whereby the pad may be shaped to conform to that of an article to be refrigerated, the pad having the further characteristic that when the liquid is frozen that the comminuted material and the bag retains its molded shape in a stiff rigid form.

4. In a device as described, a rigid container with material to be refrigerated therein, a pad formed of a bag of relatively inexpensive waterproof material filled with a comminuted liquid absorbent material with a liquid in the bag filling the interstices of the material and in part absorbed by such material, the said bag being sealed and thus liquid tight, the bag being shaped and molded to cover the exterior of at least part of the container and the liquid being frozen to form a stiff molded pad in close contact with at least part of the container, the pad having the characteristic that when the liquid melts and it becomes soft that it gives an indication of its loss of refrigerating properties.

5. In the art described, maintaining a product in a container in a refrigerated condition by molding or shaping a pad to enclose at least part of the container, said pad while being molded having the characteristics of an outside flexible liquid proof covering closed and sealed and with a filling of a comminuted material and with a liquid filling the interstices of the material, the liquid after molding of the pad being congealed by freezing to cause the adhesion of the comminuted material and form a stiff molded pad over at least part of the container.

6. In the art described as claimed in claim 5, the said pad again becoming soft and pliable on melting of the liquid and thereby losing its refrigerating properties.

7. In a device as described, a water proof covering having a filling of comminuted absorbent material impregnated with a liquid having a lower freezing point than fresh water, the said cover and its contents forming a pad substantially rectangular and of substantially uniform thickness, the pad being adapted to be applied to a food product which it is desired to maintain at a temperature below the freezing point of fresh water, said pad when the water is frozen being stiff and rigid and when the water thaws, being soft to the touch and thereby indicating a loss of its refrigerating properties.

CHARLES E. HADSELL.